(12) United States Patent
Diekhaus

(10) Patent No.: US 10,440,973 B2
(45) Date of Patent: Oct. 15, 2019

(54) LONG-KEEP CREAM WITHOUT PRESERVATIVES

(71) Applicant: DMK Deutsches Milchkontor GmbH, Zeven (DE)

(72) Inventor: Martin Diekhaus, Holdorf (DE)

(73) Assignee: DMK Deutsches Milchkontor GmbH, Zeven (DE)

( * ) Notice: Subject to any disclaimer, the term of this patent is extended or adjusted under 35 U.S.C. 154(b) by 541 days.

(21) Appl. No.: 14/692,288

(22) Filed: Apr. 21, 2015

(65) Prior Publication Data

US 2015/0305360 A1 Oct. 29, 2015

(30) Foreign Application Priority Data

Apr. 24, 2014 (EP) .................................. 14165741

(51) Int. Cl.
*A23C 13/12* (2006.01)
*A23C 13/08* (2006.01)

(52) U.S. Cl.
CPC .............. *A23C 13/12* (2013.01); *A23C 13/08* (2013.01)

(58) Field of Classification Search
CPC ................... A23C 13/08; A23C 13/12
See application file for complete search history.

(56) References Cited

U.S. PATENT DOCUMENTS

| | | | | |
|---|---|---|---|---|
| 3,117,879 A | * | 1/1964 | Swanson | A23C 13/08 426/388 |
| 4,798,731 A | * | 1/1989 | Ranjith | A23C 3/037 426/522 |

FOREIGN PATENT DOCUMENTS

| | | |
|---|---|---|
| CA | 2084332 A1 | 6/1993 |
| EP | 0 167 994 A2 | 1/1986 |
| EP | 0 563 593 A1 | 10/1993 |
| EP | 2 092 832 A1 | 8/2009 |

OTHER PUBLICATIONS

Köhler et al, "Melt emulsification—Is there a chance to produce particles without additives?", Particuology vol. 9, No. 5, Mar. 14, 2011, pp. 506-509.

* cited by examiner

*Primary Examiner* — Michele L Jacobson
*Assistant Examiner* — Preston Smith
(74) *Attorney, Agent, or Firm* — Dilworth & Barrese, LLP

(57) ABSTRACT

A method is proposed for producing a milk product, preferably a cream product having an average particle size less than 3 μm, which has a shelf life of at least 4 weeks, but does not contain preservatives.

11 Claims, No Drawings

LONG-KEEP CREAM WITHOUT PRESERVATIVES

FIELD OF THE INVENTION

The invention relates to the field of food technology and relates to a method for producing (O/W) emulsions, preferably cream products having improved storage stability.

PRIOR ART

Emulsions belong to the disperse systems, which are also termed dispersions. An emulsion is a dispersion of two immiscible fluids, generally oil and water, wherein one of the liquids is present in the other in the form of dispersed droplets. Depending on the quantity ratios of the two immiscible phases, these are termed oil-in-water (O/W) emulsions or water-in-oil (W/O) emulsions.

Many foods are liquid or solidified solid emulsions or suspensions which were emulsions during production (milk and milk products, delicatessen products such as, e.g. mayonnaise or sauces, bread spreads, dressings, and many desserts). However, emulsions are found not only in the food product field, but also as intermediates and end products in many other industrial branches, e.g. cosmetics, pharmaceuticals, bitumen, cleaning agents, paints, varnishes, agrochemical products and coatings.

Typical droplet diameters in an emulsion are in the size range of 0.1-100 μm. Strictly speaking, such systems are "macroemulsions", but in general speech, they are termed only "emulsions".

Since the free energy in such a disperse system is increased in comparison with the separate phases by the interface energy, emulsions are thermodynamically unstable. Non-stabilized droplets form agglomerates (flocks), or coalesce. On account of the difference in density between the two phases, in addition, sedimentation or creaming of the droplets may be observed. In addition, Ostwald ripening occurs, on account of osmotic effects. In the worst case, an emulsion breaks, i.e. the phases separate again and the disperse character is completely lost. If an emulsion is unstable, it loses its quality before the use-by date and therefore cannot be put on the market.

Examples of (O/W) emulsions in the food sector are, inter alia: milk, cream, yoghurt, cheese, mayonnaise, ice cream and dressings.

Cream is an (O/W) emulsion of milk fat and water, but the fat droplets are larger and more numerous and make the cream still whiter than milk. Cream contains less milk protein than milk. Cream serves as a basis for producing butter and cheese. Acidic cream and sweet cream are very popular in cuisine. Sauces, sweet dishes, dips and many more may be produced therefrom.

Cream is formed by what is termed the creaming of milk. Creaming denotes the fat droplets in milk rising to the surface of the milk and settling there as cream. The cream may be simply scooped from the milk. Creaming can only occur in the milk if it has not previously been homogenized. If the milk is homogenized, the diameter of the fat droplets is greatly decreased. The fat droplets are distributed better in the milk as a result, and so they can no longer rise to the surface of the milk.

Now, cream is produced industrially. In this case, however, cream is not produced by creaming the milk, but is obtained by what is termed centrifugation. The milk for this purpose is placed in a centrifuge which is termed a separator. There, the milk is spun so strongly that the milk fat separates from the milk and only skimmed milk having a fat content of 0.03 to 0.06 percent remains behind. By adding skimmed milk back to a part of the milk fat, cream products are obtained.

In the case of cream, a distinction must be made between non-acidified and acidified cream. Furthermore, there are cream products which differ in their fat content. The following fat stages of the cream types may be mentioned: cream (25-29% by weight), whipping cream (30-33% by weight), whipping cream "extra" (36% by weight), coffee cream (10-15% by weight).

Cream is required in many forms for producing foods, or in the preparation of dishes. For many of these fields of application, the usual keeping quality of the cream, generally a few days, is insufficient. This is especially the case when climate conditions make harvesting vegetables—e.g. spinach—impossible, but the cream for further processing thereof has already been delivered. This is a great problem for the manufacturers, since the product in some circumstances can no longer be used.

Commercially available cream, owing to its content of casein, is unstable at relatively low pHs, and, for this reason, cannot be processed in combination with fruits and berries and stored over a relatively long period. These stabilizers are used, for example, in the production of cream gateaux, where, by means of these stabilizing additives, the whipped cream is to be prevented from prematurely collapsing. Also, it is ensured thereby that the cream is frost stable.

DE 42 26 850 A1 describes a method for treatment and/or a fat emulsion, wherein the emulsion is treated with ultrasound. Preferably, before and/or during the ultrasound treatment, stabilizers are added to the emulsion that is to be treated.

EP 1 086 625 B1 and EP 0 805 629 B1 describe a method for producing a cream- and gelatin-containing milk product.

DE 60 2004 001 002 T2 describes the use of a sugar alcohol composition comprising α-D-glucopyranosyl-1,6-sorbitol for producing cream.

DE 44 36 989 A1 describes the use of water-soluble components, such as proteins and pentosans, that are to be isolated from rye milling products, as stabilizing additive for cream.

EP 1 825 759 B1 describes a method for producing cream from milk, wherein the method comprises reducing a concentration of dissolved oxygen in the milk before separating off the cream.

EP 2 594 137 A1 describes a method for producing a low-temperature cream which must be whipped, wherein the fresh cream is cooled to a temperature of −5° C. or below −5° C., in a time interval of 8 minutes, or less than 8 minutes.

These methods of the prior art, however, have the disadvantage that the cream products produced contain stabilizers—generally produced on a gelatin basis. They require a special preparation which necessitates an additional technological expenditure.

On account of the growing interest of a large part of the population in "healthy nutrition" and a healthy mode of life in general, there is an increasing interest in the production of high-quality grade and wholesome foodstuffs with natural ingredients without additives. Therefore, on the market, there is a great and increasing requirement for milk products that have an improved stability and do not contain stabilizers.

The object of the present invention was therefore to provide a cream which has a shelf life of at least 4 weeks, but does not contain preservatives, since they are completely unwanted in the context of a "healthy" diet.

DESCRIPTION OF THE INVENTION

Subject matter of the invention is a method for producing (O/W) emulsions having improved storage stability, in which
a) an (O/W) emulsion is subjected to a first high-pressure homogenization at a temperature in the range from about 50° C. to about 100° C.,
b) the product obtained in step a) is heated to about 135° C. up to about 150° C.,
c) the product obtained in step b) is cooled to a temperature below 100° C.,
d) the product obtained in step c) is subjected to a second high-pressure homogenization at a temperature in the range from about 50° C. to about 80° C.,
e) the product obtained in step d) is cooled to a temperature from about 0° C. to about 20° C., and the product obtained in step e) is packaged.

A second subject matter of the invention relates to a milk product having an average particle size, depending on fat content, from about 1 to about 4 µm, and the production method thereof.

A third subject matter of the invention relates to a cream product which has a longer shelf life, but does not contain preservatives, and the production method thereof.

Surprisingly, it has been found that by means of a production method, comprising a two-stage homogenization step and two-stage cooling step, a cream product is produced which has an average particle size less than 3 µm. In addition, these cream products are distinguished in that they have a shelf life of at least 4 weeks, although they do not contain preservatives.

An "emulsion" in the meaning of this invention is to be taken to mean here any solution of fat droplets in water. An "emulsion" in the meaning of this invention is present, regardless of whether further components are still present in the solution or not. In particular, what is termed an emulsion substrate in which further components are still present in the solution, such as, for example, a dispersion (dispersed components) and/or a suspension and/or a colloidal solution and/or a true solution (dissolved components, salts), is to be considered as an emulsion in the meaning of this invention. In such emulsion substrates, components, in particular dispersed and/or truly dissolved components, can be present, for example, which act as emulsifiers and can be used for promoting emulsion or reemulsion processes or can accelerate such processes.

In a preferred embodiment, the (O/W) emulsion is a milk product selected from the group consisting of milk, yoghurt, bioguhrt, set milk, condensed milk, crème fraîche, sour cream, sweet cream, Kefir, ice cream, smetana, crème légère.

In a very particularly preferred embodiment, the milk product is a cream product.

The fat content in the cream product used in the present invention can be in the range from about 25-55% by weight, preferably in the range from about 27-40% by weight, and in particular in the range from about 30-36% by weight.

According to the present invention, the cream product can be any which is available on the market as cream for whipping. That is to say the cream product can include those which contain conventional emulsifiers, stabilizers or the like. In addition, cream products can be those obtained by replacement of all or part of the milk fat in the cream by vegetable oil, or those obtained by mixing whole milk, reconstituted milk, modified milk, or skimmed milk with milk fat and/or vegetable oil. Therefore, the fat and oil fraction in the cream product can be milk fat, vegetable oil or a mixture thereof. Examples of vegetable oils which are used for producing the cream product used in the present invention include, but are not restricted thereto, coconut oil, palm oil, palm kernel oil, soybean oil, canola oil and maize oil.

The cream products used in the present invention can additionally comprise additives which are known to be incorporated into conventional cream products, such as emulsifiers, flavourings, preservatives, prebiotic substances, sweeteners, food acids, acidity regulators, thickening agents and aroma substances.

Emulsifiers are distinguished by the important property of being soluble both in water and in fat. Emulsifiers mostly consist of a fat-soluble part and a water-soluble part. They are always used when water and oil are to be brought into a lasting homogeneous mixture. Suitable emulsifiers which are used in the food processing industry are selected from: ascorbyl palmitate (E 304), lecithin (E 322), phosphoric acid (E 338), sodium phosphate (E 339), potassium phosphate (E 340), calcium phosphate (E 341), magnesium orthophosphate (E 343), propylene glycol alginate (E 405), polyoxyethylene(8) stearate (E 430), polyoxyethylene stearate (E 431), ammonium phosphatides (E 442), sodium phosphate and potassium phosphate (E 450), sodium salts of edible fatty acids (E 470 a), mono- and diglycerides of edible fatty acids (E 471), acetic acid monoglycerides (E 472 a), lactic acid monoglycerides (E 472 b), citric acid monoglycerides (E 472 c), tartaric acid monoglycerides (E 472 d), diacetyltartaric acid monoglycerides (E 472 e), sugar esters of edible fatty acids (E 473), sugar glycerides (E 474), polyglycerides of edible fatty acids (E 475), polyglycerol polyricinoleate (E 476), propylene glycol esters of edible fatty acids (E 477), sodium stearoyl lactylate (E 481), calcium stearoyl-2-lactylate (E 482), stearyl tartrate (E 483), sorbitan monostearate (E 491), stearic acid (E 570).

In addition, cream products preferred according to the invention can also comprise aroma substances for masking bitter and/or astringent taste impressions (taste correctors). The (further) taste correctors are selected, e.g., from the following list: nucleotides (e.g. adenosine-5'-monophosphate, cytidine-5'-monophosphate) or the pharmaceutically acceptable salts thereof, lactisols, sodium salts (e.g. sodium chloride, sodium lactate, sodium citrate, sodium acetate, sodium gluconate), further hydroxyflavanones (e.g. eriodictyol, homoeriodictyol or the sodium salts thereof), in particular according to US 2002/0188019, hydroxybenzamides according to DE 10 2004 041 496 (e.g. 2,4-dihydroxybenzoic acid vanillylamide, 2,4-dihydroxybenzoic acid N-(4-hydroxy-3-methoxybenzyl)amide, 2,4,6-trihydroxybenzoic acid N-(4-hydroxy-3-methoxybenzyl)amide, 2-hydroxybenzoic acid N-4-(hydroxy-3-methoxybenzyl)amide, 4-hydroxybenzoic acid N-(4-hydroxy-3-methoxybenzyl)amide, 2,4-dihydroxybenzoic acid N-(4-hydroxy-3-methoxybenzyl)amide monosodium salt, 2,4-dihydroxybenzoic acid N-2-(4-hydroxy-3-methoxyphenyl)ethylamide, 2,4-dihydroxybenzoic acid N-(4-hydroxy-3-ethoxybenzyl)amide, 2,4-dihydroxybenzoic acid N-(3,4-dihydroxybenzyl)amide and 2-hydroxy-5-methoxy-N-[2-(4-hydroxy-3-methoxyphenyl)ethyl]amide (aduncamide), 4-hydroxybenzoic acid vanillylamide), bitter-masking hydroxydeoxybenzoins, e.g. according to WO 2006/106023 (e.g. 2-(4-hydroxy-3-methoxyphenyl)-1-(2,4,6-trihydroxyphenyl)ethanone, 1-(2,4-dihydroxyphenyl)-2-(4-hydroxy-3-methoxyphenyl)ethanone, 1-(2-hydroxy-4-methoxyphenyl)-2-(4-hydroxy-3-methoxyphenyl)ethanone), amino acids (e.g. gamma-aminobutyric acid according to WO 2005/096841 for reducing or masking an unpleasant taste impression such as bitterness), malic acid glycosides according to WO 2006/003107, salt-tasting mixtures according to PCT/EP 2006/067120, diacetyltrimers according to WO 2006/058893, mixtures of whey proteins with lecithins and/or bitter-masking substances such as gingerdione according to WO 2007/003527.

Sweeteners or sweet-tasting additives which come into consideration are firstly carbohydrates, and especially sugars, such as sucrose, trehalose, lactose, maltose, melizitose, raffinose, palatinose, lactulose, D-fructose, D-glucose, D-galactose, L-rhamnose, D-sorbose, D-mannose, D-tagatose, D-arabinose, L-arabinose, D-ribose, D-glyceraldehyde, or maltodextrin. Equally suitable are plant preparations which contain these substances, for example based on sugar beets (*Beta vulgaris* ssp., sugar fractions, sugar syrup, molasses), sugar cane (*Saccharum officinarum* ssp., molasses, cane sugar syrup), maple syrup (*Acer* ssp.) or agave (agave thick juice).

Synthetic, that is to say generally enzymatically produced, starch or sugar hydrolysates (invert sugar, fructose syrup) also come into consideration:
- fruit concentrates (e.g. based on apples or pears);
- sugar alcohols (e.g. erythritol, threitol, arabitol, ribotol, xylitol, sorbitol, mannitol, dulcitol, lactitol);
- proteins (e.g. miraculin, monellin, thaumatin, curculin, brazzein);
- sweeteners (e.g. MAGAP, sodium cyclamate, acesulfame K, neohesperidin dihydrochalcone, saccharin sodium salt, aspartame, superaspartame, neotame, alitame, sucralose, stevioside, rebaudioside, lugduname, carrelame, sucrononates, sucrooctates, monatin, phenylodulcin);
- sweet-tasting amino acids (e.g. glycine, D-leucine, D-threonine, D-asparagine, D-phenylalanine, D-tryptophan, L-proline);
- further sweet-tasting low-molecular-weight substances, such as, e.g., hernandulcin, dihydrochalcone glycosides, glycyrrhizin, glycyrrhetic acid, derivatives and salts thereof, extracts of liquorice (*glycyrrhizza glabra* ssp.), *Lippia dulcis* extracts, *Momordica* ssp. extracts or individual substances such as, e.g., *Momordica grosvenori* [Luo Han Guo] and the mogrosides obtained therefrom, *Hydrangea dulcis* or *Stevia* ssp. (e.g. *Stevia rebaudiana*) extracts.

The cream products can contain carboxylic acids. Acids in the meaning of the invention are preferably acids permitted in foods, in particular those cited here:
E 260—acetic acid
E 270—lactic acid
E 290—carbon dioxide
E 296—malic acid
E 297—fumaric acid
E 330—citric acid
E 331—sodium citrate
E 332—potassium citrate
E 333—calcium citrate
E 334—tartaric acid
E 335—sodium tartrate
E 336—potassium tartrate
E 337—sodium potassium tartrate
E 338—phosphoric acid
E 353—metatartaric acid
E 354—calcium tartrate
E 355—adipic acid
E 363—succinic acid
E 380—triammonium citrate
E 513—sulfuric acid
E 574—gluconic acid
E 575—glucono-delta-lactone Acidity regulators are food additives which keep constant the degree of acidity or basicity and thereby the desired pH of a food. They are mostly organic acids and salts thereof, carbonates, more rarely also inorganic acids and salts thereof. The addition of an acidity regulator partly increases the stability and strength of the food, effects a desired precipitation and improves the action of preservatives. In contrast to acidulants, they are not used for taste modification of foods. Their action is based on the formation of a buffer system in the food, in which the pH is not changed or changed only slightly on addition of acidic or basic substances. Examples are:
E 170—calcium carbonate
E 260-263—acetic acid and acetates
E 270—lactic acid
E 296—malic acid
E 297—fumaric acid
E 325-327—lactates (lactic acid)
E 330-333—citric acid and citrates
E 334-337—tartaric acid and tartrates
E 339-341—orthophosphates
E 350-352—malates (malic acid)
E 450-452—di-, tri- and polyphosphates
E 500-504—carbonates (carbonic acid)
E 507—hydrochloric acid and chlorides
E 513-517—sulfuric acid and sulfates
E 524-528—hydroxides
E 529-530—oxides
E 355-357—adipic acid and adipates
E 574-578—gluconic acid and gluconates Thickeners are substances which are primarily able to bind water. By withdrawing unbound water, the viscosity increases. From a concentration that is characteristic for each thickener, in addition to this effect, also crosslinking effects occur which lead to a usually disproportional increase in viscosity. In this case, molecules are said to 'communicate' with one another, i.e. to entangle. Most thickeners are linear or branched macromolecules (e.g. polysaccharides or proteins), which can interact with one another via intermolecular interactions, such as hydrogen bridges, hydrophobic interactions or ionic relationships. Extreme cases of thickeners are sheet silicates (bentonite, hectorite) or hydrated $SiO_2$ particles, which are present as particles in dispersed form and in their solid-like structure can bind water, or, on account of the described interactions can interact with one another. Examples are:
E 400—alginic acid
E 401—sodium alginate
E 402—potassium alginate
E 403—ammonium alginate
E 404—calcium alginate
E 405—propylene glycol alginate
E 406—agar agar
E 407—carrageenan, furcelleran
E 410—carob bean gum
E 412—guar gum
E 413—tragacanth
E 414—gum arabic
E 415—xanthan
E 416—karaya (Indian tragacanth)
E 417—tara gum (Peruvian carob bean gum)
E 418—gellan
E 440—pectin, Opekta
E 440ii—amidated pectin E 460—microcrystalline cellulose, cellulose powder
E 461—methylcellulose
E 462—ethylcellulose
E 463—hydroxypropylcellulose
E 465—methylethylcellulose
E 466—carboxymethylcellulose, sodium carboxymethylcellulose The invention also permits, in particular, the use of aroma substances having an ester, aldehyde or lactone structure which are particularly rapidly broken down in the presence of titanium dioxide and under the influence of light. The invention therefore also ensures an improved stability, especially storage stability, of the aroma substances.

The oral preparations according to the invention can contain one or more aroma substances. Typical examples comprise: acetophenone, allylcapronate, alpha-ionone, beta-ionone, anisaldehyde, anisyl acetate, anisyl formate, benzaldehyde, benzothiazole, benzyl acetate, benzyl alcohol, benzyl benzoate, beta-ionone, butyl butyrate, butyl caproate, butylidene phthalide, carvone, camphene, caryophyllene, cineole, cinnamyl acetate, citral, citronellol, citronellal, citronellyl acetate, cyclohexyl acetate, cymene, damascone, decalactone, dihydrocoumarin, dimethyl anthranilate, dodecalactone, ethoxy ethylacetate, ethylbutyric acid, ethyl butyrate, ethyl caprate, ethyl caproate, ethyl crotonate, ethylfuraneol, ethylguaiacol, ethyl isobutyrate, ethyl isovalerate, ethyl lactate, ethyl methylbutyrate, ethyl propionate, eucalyptol, eugenol, ethyl heptylate, 4-(p-hydroxyphenyl)-2-butanone, gamma-decalactone, geraniol, geranyl acetate, grapefruit aldehyde, methyl dihydrojasmonate (e.g. Hedion®), heliotropin, 2-heptanone, 3-heptanone, 4-heptanone, trans-2-heptenal, cis-4-heptenal, trans-2-hexenal, cis-3-hexenol, trans-2-hexenoic acid, trans-3-hexenoic acid, cis-2-hexenyl acetate, cis-3-hexenyl acetate, cis-3-hexenyl caproate, trans-2-hexenyl caproate, cis-3-hexenyl formate, cis-2-hexyl acetate, cis-3-hexyl acetate, trans-2-hexyl acetate, cis-3-hexyl formate, para-hydroxybenzylacetone, isoamyl alcohol, isoamyl isovalerate, isobutyl butyrate, isobutyraldehyde, isoeugenol methyl ether, isopropyl methylthiazole, lauric acid, leavulic acid, linalool, linalool oxide, linalyl acetate, menthol, menthofuran, methyl anthranilate, methylbutanol, methylbutyric acid, 2-methylbutyl acetate, methyl caproate, methyl cinnamate, 5-methylfurfural, 3,2,2-methylcyclopentenolone, 6,5,2-methylheptenone, methyl dihydrojasmonate, methyl jasmonate, 2-methyl methyl butyrate, 2-methyl-2-pentenoic acid, methyl thiobutyrate, 3,1-methylthiohexanol, 3-methylthiohexyl acetate, nerol, neryl acetate, trans,trans-2,4-nonadienal, 2,4-nonadienol, 2,6-nonadienol, 2,4-nonadienol, nootkatone, delta octalactone, gamma octalactone, 2-octanol, 3-octanol, 1,3-octenol, 1-octyl acetate, 3-octyl acetate, palmitic acid, paraldehyde, phellandrene, pentanedione, phenylethyl acetate, phenylethyl alcohol, phenylethyl isovalerate, piperonal, propionaldehyde, propyl butyrate, pulegone, pulegol, sinensal, sulfurol, terpinene, terpineol, terpinolene, 8,3-thiomenthanone, 4,4,2-thiomethylpentanone, thymol, delta-undecalactone, gamma-undecalactone, valencene, valeric acid, vanillin, acetoin, ethylvanillin, ethylvanillin isobutyrate (=3-ethoxy-4-isobutyryloxybenzaldehyde), 2,5-dimethyl-4-hydroxy-3(2H)-furanone and derivatives thereof (in this case preferably homofuraneol (=2-ethyl-4-hydroxy-5-methyl-3(2H)-furanone), homofuronol (=2-ethyl-5-methyl-4-hydroxy-3(2H)-furanone and 5-ethyl-2-methyl-4-hydroxy-3(2H)-furanone), maltol and maltol derivatives (in this case preferably ethylmaltol), coumarin and coumarin derivatives, gamma-lactones (in this case preferably gamma-undecalactone, gamma-nonalactone, gamma-decalactone), delta-lactones (in this case preferably 4-methyldeltadecalactone, massoia lactone, deltadecalactone, tuberolactone), methyl sorbate, divanillin, 4-hydroxy-2(or 5)-ethyl-5(or 2)-methyl-3(2H)furanone, 2-hydroxy-3-methyl-2-cyclopentenone, 3-hydroxy-4,5-dimethyl-2(5H)-furanone, acetic acid isoamyl ester, butyric acid ethyl ester, butyric acid n-butyl ester, butyric acid isoamyl ester, 3-methylbutyric acid ethyl ester, n-hexanoic acid ethyl ester, n-hexanoic acid allyl ester, n-hexanoic acid n-butyl ester, n-octanoic acid ethyl ester, ethyl-3-methyl-3-phenyl glycidate, ethyl 2-trans-4-cis-decadienoate, 4-(p-hydroxyphenyl)-2-butanone, 1,1-dimethoxy-2,2,5-trimethyl-4-hexane, 2,6-dimethyl-5-hepten-1-al and phenylacetaldehyde, 2-methyl-3-(methylthio)furan, 2-methyl-3-furanthiol, bis(2-methyl-3-furyl) disulfide, furfuryl mercaptan, methional, 2-acetyl-2-thiazoline, 3-mercapto-2-pentanone, 2,5-dimethyl-3-furanthiol, 2,4,5-trimethylthiazole, 2-acetylthiazole, 2,4-dimethyl-5-ethylthiazole, 2-acetyl-1-pyrroline, 2-methyl-3-ethylpyrazine, 2-ethyl-3,5-dimethylpyrazine, 2-ethyl-3,6-dimethylpyrazine, 2,3-diethyl-5-methylpyrazine, 3-isopropyl-2-methoxypyrazine, 3-isobutyl-2-methoxypyrazine, 2-acetylpyrazine, 2-pentylpyridine, (E,E)-2,4-decadienal, (E,E)-2,4-nonadienal, (E)-2-octenal, (E)-2-nonenal, 2-undecenal, 12-methyltridecanal, 1-penten-3-one, 4-hydroxy-2,5-dimethyl-3(2H)-furanone, guaiacol, 3-hydroxy-4,5-dimethyl-2(5H)-furanone, 3-hydroxy-4-methyl-5-ethyl-2(5H)-furanone, cinnamaldehyde, cinnamyl alcohol, methyl salicylate, isopulegol and also (here not cited explicitly) stereoisomers, enantiomers, positional isomers, diastereomers, cis/trans-isomers and epimers of these substances.

In a further embodiment of the present invention, the food additives, as a further optional group of additives, can contain vitamins. Vitamins have the most varied biochemical modes of action. Some act in a similar manner to hormones and regulate mineral metabolism (e.g. vitamin D), or act on the growth of cells and tissue and also cell differentiation (e.g. some forms of vitamin A). Others are antioxidants (e.g. vitamin E and, under certain circumstances, also vitamin C). The greatest number of vitamins (e.g. the B vitamins) are precursors for enzymatic cofactors, which support enzymes here to catalyze certain processes in metabolism. In this connection, vitamins can sometimes be closely bound to the enzymes, for example as part of the prosthetic group: an example hereof is biotin which is a part of the enzyme that is responsible for the structure of fatty acids. Vitamins, on the other hand, can also be less strongly bound and then act as cocatalysts, for example as groups which may readily be eliminated and transport chemical groups or electrons between the molecules. For instance, folic acid, for example, transports methyl, formyl and methylene groups into the cell. Although its support in enzyme-substrate reactions is well known, its remaining properties are also of great importance for the body.

In the context of the present invention, vitamins come into consideration as substances that are selected from the group consisting of
vitamin A (retinol, retinal, beta-carotene),
vitamin $B_1$ (thiamin),
vitamin $B_2$ (riboflavin),
vitamin $B_3$ (niacin, niacinamide),
vitamin $B_5$ (pantothenic acid),
vitamin $B_6$ (pyridoxine, pyridoxamine and pyridoxal),
vitamin $B_7$ (biotin),
vitamin $B_9$ (folic acid, folinic acid),
vitamin $B_{12}$ (cyanobalamin, hydroxycobalmin, methylcobalmin),
vitamin C (ascorbic acid), vitamin D (cholecalciferol),
vitamin E (tocopherols, tocotrienols) and
vitamin K (phyllolquinone, menaquinone).

In a further development of the invention, the preparations can additionally contain prebiotics that form the group H. Prebiotics are defined as indigestible dietary components, the administration of which stimulates the growth or the activity of a number of useful bacteria in the large intestine. The addition of prebiotic compounds improves the stability of anthocyanins versus breakdown processes in the intestinal tract.

In the food industry, both natural, and also artificial, antioxidants are used. Natural and artificial antioxidants differ primarily in that the former naturally occur in the diet, and the latter are produced artificially. For instance, natural antioxidants, if they are to be used as food additive, are obtained, for example, from vegetable oils. Vitamin E—also termed tocopherol—is often produced, for example, from soya oil. Synthetic antioxidants such as propyl gallate, octyl gallate and dodecyl gallate, in contrast, are obtained by chemical synthesis. The gallates can trigger allergies in sensitive persons. Further antioxidants that are usable in compositions of the present invention are: sulphur dioxide, E 220 sulphites sodium sulphite, E 221 sodium hydrogensulphite, E 222 sodium disulphite, E 223 potassium disulphite, E 224 calcium sulphite, E 226 calcium hydrogensulphite, E 227 potassium hydrogensulphite, E 228 lactic acid, E 270 ascorbic acid, E 300 sodium L-ascorbate, E 301 calcium L-ascorbate, E 302 ascorbic acid esters, E 304 tocopherol, E 306 alpha-tocopherol, E 307 gamma-tocopherol, E 308 delta-tocopherol, E 309 propyl gallate, E 310 octy gallate, E 311 dodecyl gallate, E 312 isoascorbic acid, E 315 sodium isoascorbate, E 316 tertiary-butylated hydroquinone (TBHQ), E 319 butyl hydroxyanisole, E 320 butylated hydroxitoluene, E 321 lecithin, E 322 citric acid, E 330 salts of citric acid (E 331 & E 332) sodium citrate, E 331 potassium citrate, E 332 calcium disodium EDTA, E 385 diphosphates, E 450 disodium diphosphate, E 450a trisodium diphosphate, E 450b tetrasodium diphosphate, E 450c dipotassium diphosphate, E 450d tripotassium diphosphate, E 450e dicalcium diphosphate, E 450f calcium dihydrogen diphosphate, E 450g triphosphates, E 451 pentasodium triphosphate, E 451a pentapotassium triphosphate, E 451b polyphosphate, E 452 sodium polyphosphate, E 452a potassium polyphosphate, E 452b sodium calcium polyphosphate, E 452c calcium polyphosphate, E 452d tin(II) chloride, E 512.

In a very particularly preferred embodiment, the cream products used in the present invention do not contain preservatives such as, e.g. gelatin.

For production of the milk product, firstly a first homogenization—step a)—proceeds, which causes a first equalization of the size of the fat particles. This customarily takes place in a special unit, preferably a high-pressure homogenizer. Such units are sufficiently known from the prior art. The product obtained is thereafter subjected to an ultra-heat treatment step—step b)—under standard conditions. The resultant product is then cooled—step c)—and then subjected to a second homogenization step—step d). In order to produce an end product having an average particle size, depending on fat content, from about 1 to about 4 µm, the resultant product is then subjected to a rapid and short cooling step in order to permit the rapid formation of small crystals. Finally, the resultant product is packaged.

In order to be able to evaluate the effect of homogenization, inter alia the following analytical methods are suitable:

microscopic assessment (light microscope, electron microscope) in various dilution steps viscosity determination, determination of the rheological data using diverse rheometers according to viscosity ranges and applications (capillary viscometer, "Viskowaage" [falling ball viscometer], drawing viscometer, rotational viscometer etc.)

determination of the degree of homogenization in % by standard load tests, e.g. as specified by NIZO determination of the particle size distribution using laser diffraction, photon correlation spectroscopy, turbidity measurement methods etc.

texture measurements (texture measurement instruments)

Determining the particle size distribution as a modern analytical method is very reliable and can be performed by those skilled in the art on the basis of their general knowledge, without thereby being inventive.

In a preferred embodiment, the homogenization pressure of step a) is in the range from about 0 to about 150 bar, preferably in the range from about 10 to about 125 bar, in particular in the range from about 15 to about 100 bar.

In another preferred embodiment, the homogenization temperature of step a) is in the range from about 50 to about 100° C., preferably in the range from about 55 to about 80° C.

For reasons of quality, the homogenization temperature, in a particularly preferred embodiment, is in the range from about 60 to about 70° C., in order not to increase the thermal loading of the product.

It has proved to be particularly expedient for the keeping quality of the novel milk product when the homogenization pressure of step a) is in the range from about 15 to about 100 bar, and the homogenization temperature of step a) is in the range from about 60 to about 75° C.

The resultant product from steps a) and b) is cooled in a first cooling step—step c).

In a preferred embodiment, the temperature of step c) is below about 100° C., preferably below about 90° C., particularly preferably below about 80° C., and more particularly preferably below about 75° C.

In a preferred embodiment, the temperature of step c) is between about 45 and 100° C., preferably between about 50 and 90° C., particularly preferably between about 55 and 80° C., and more particularly preferably between about 60 and 75° C.

In a preferred embodiment, the homogenization pressure of step d) is in the range from about 60 to about 110 bar, preferably in the range from about 70 to about 100 bar, in particular in the range from about 80 to about 90 bar.

In a preferred embodiment, the temperature of step d) is between about 45 and 100° C., preferably between about 50 and 90° C., particularly preferably between about 55 and 80° C., and more particularly preferably between about 60 and 75° C.

It is particularly expedient for the keeping quality of the novel milk product when the homogenization pressure d) and the homogenization pressure of step a) are in the range from about 80 to about 90 bar, and the homogenization temperature of step d) is in the range from about 60 to about 70° C.

It has proved that the technical parameters of the second cooling step e) affect the physical stability of the end product. The choice of the temperature and also of the time interval in which the cooling step e) proceeds is of critical importance. Only by means of carrying out step e) under certain conditions with respect to time and temperature will the average particle size be reached which can ensure an improved keeping quality of the end product.

It has proved that end products having an average particle size from about 1 to about 4 µm depending on fat content have an improved keeping quality.

In a preferred embodiment, the temperature of step e) is below about 30° C., preferably below about 20° C., particularly preferably below about 10° C., and more particularly preferably below about 10° C.

In a preferred embodiment, the temperature of step e) is between about −10 and 30° C., preferably between about −5 and 20° C., and particularly preferably between about 0 and 10° C.

In a preferred embodiment, the temperature of step e) is in a time interval of at most about 30 seconds, preferably of at most about 20 seconds, and particularly preferably of at most about 10 seconds.

It has proved to be particularly expedient for producing the novel milk product having an average particle size from about 1 to about 4 µm depending on fat content when the cooling temperature of step e) is between 0 and 6° C., wherein the cooling temperature is reached in a time interval from 1 to 10 seconds.

According to a further embodiment, a cream product having an average particle size from about 1 to about 4 µm depending on fat content is produced by means of a method which comprises the following stages:
a) a first high-pressure homogenization of a cream product, wherein the temperature is between 60 and 75° C. and the pressure is between 10 and 100 bar,
b) an ultra heat treatment, wherein the temperature is between 135 and 145° C.,
c) a first cooling stage at a temperature between 60 and 75° C.,
d) a second high-pressure homogenization, wherein the temperature is between 60 and 75° C. and the pressure is between 80 and 90 bar,
e) a second cooling stage of a maximum temperature of 6° C., wherein the cooling temperature is reached in a time interval of at most 6 seconds.

INDUSTRIAL APPLICABILITY

According to the present invention, cream products having an average particle size less than 3 µm can be produced. The cream products according to the present invention have a shelf life of at least 4 weeks, but they do not contain preservatives. The cream products according to the present invention are suitable in particular as semi-finished products for commercial cuisine.

EXAMPLES

The present invention will be understood more readily with reference to the examples hereinafter. However, these examples serve only for illustration of the invention and cannot be interpreted as restrictive with respect to the scope of protection of the invention.

Production Examples 1 to 7

Example 1

Whipping cream, 30% fat by weight, was heated in a stirred tank with constant stirring at 65° C. and then septically homogenized in continuous flow through a high-pressure homogenizer at 15 bar. The cream product was brought up to and maintained at 135° C. for 5 seconds and immediately cooled down to 65° C. The resultant cream product was then subjected to a second homogenization step at 80 bar under aseptic conditions. Subsequently the temperature of the system was lowered to 5° C. in a time interval of 9 seconds and the cream product was packaged. The average particle size of the resultant cream product determined by laser diffraction was 3 µm.

Example 2

Whipping cream, 33% fat by weight, was heated in a stirred tank with constant stirring at 65° C. and then septically homogenized in continuous flow through a high-pressure homogenizer at 15 bar. The cream product was brought up to and maintained at 138° C. for 5 seconds and immediately cooled down to 65° C. The resultant cream product was then subjected to a second homogenization step at 80 bar under aseptic conditions. Subsequently the temperature of the system was lowered to 4° C. in a time interval of 6 seconds and the cream product was packaged. The average particle size of the resultant cream product determined by laser diffraction was 3 µm.

Example 3

Whipping cream, 30% fat by weight, was heated in a stirred tank with constant stirring at 65° C. and then septically homogenized in continuous flow through a high-pressure homogenizer at 15 bar. The cream product was brought up to and maintained at 138° C. for 5 seconds and immediately cooled down to 65° C. The resultant cream product was then subjected to a second homogenization step at 85 bar under aseptic conditions. Subsequently the temperature of the system was lowered to 4° C. in a time interval of 4 seconds and the cream product was packaged. The average particle size of the resultant cream product determined by laser diffraction was 3 µm.

Example 4

Whipping cream "extra", 36% fat by weight, was heated in a stirred tank with constant stirring at 65° C. and then septically homogenized in continuous flow through a high-pressure homogenizer at 10 bar. The cream product was brought up to and maintained at 140° C. for 3 seconds and immediately cooled down to 68° C. The resultant cream product was then subjected to a second homogenization step at 70 bar under aseptic conditions. Subsequently the temperature of the system was lowered to 4° C. in a time interval of 5 seconds and the cream product was packaged. The average particle size of the resultant cream product determined by laser diffraction was 3 µm.

Example 5

Whipping cream, 33% fat by weight, was heated in a stirred tank with constant stirring at 70° C. and then septically homogenized in continuous flow through a high-pressure homogenizer at 20 bar. The cream product was brought up to and maintained at 140° C. for 3 seconds and immediately cooled down to 60° C. The resultant cream product was then subjected to a second homogenization step at 90 bar under aseptic conditions. Subsequently the temperature of the system was lowered to 3° C. in a time interval of 3 seconds and the cream product was packaged. The average particle size of the resultant cream product determined by laser diffraction was 2 μm.

Example 6

Whipping cream, 30% fat by weight, was heated in a stirred tank with constant stirring at 67° C. and then septically homogenized in continuous flow through a high-pressure homogenizer at 30 bar. The cream product was brought up to and maintained at 140° C. for 3 seconds and immediately cooled down to 65° C. The resultant cream product was then subjected to a second homogenization step at 90 bar under aseptic conditions. Subsequently the temperature of the system was lowered to 3° C. in a time interval of 3 seconds and the cream product was packaged. The average particle size of the resultant cream product determined by laser diffraction was 2 μm.

Example 7

Whipping cream, 35% fat by weight, was heated in a stirred tank with constant stirring at 66° C. and then septically homogenized in continuous flow through a high-pressure homogenizer at 20 bar. The cream product was brought up to and maintained at 138° C. for 3 seconds and immediately cooled down to 62° C. The resultant cream product was then subjected to a second homogenization step at 75 bar under aseptic conditions. Subsequently the temperature of the system was lowered to 1° C. in a time interval of 3 seconds and the cream product was packaged. The average particle size of the resultant cream product determined by laser diffraction was 3 μm.

The invention claimed is:

1. A method for producing oil-in-water emulsions having an average particle size of less than 3 μm, comprising the following steps:
   (a) subjecting an oil-in-water emulsion to a first high-pressure homogenization at a temperature in the range from about 50° C. to about 100° C.,
   (b) heating the product obtained in step a) to about 135° C. up to about 150° C.,
   (c) cooling the product obtained in step b) to a temperature below 100° C.,
   (d) subjecting the product obtained in step c) to a second high-pressure homogenization at a temperature in the range from about 50° C. to about 80° C. and a pressure in the range from about 60 to about 100 bar,
   (e) cooling the product obtained in step d) to a temperature from about 0° C. to about 10° C., wherein the cooling temperature is reached in a time interval from 1 to 10 seconds, and
   (f) packaging the product obtained in step e).

2. The method of claim 1, wherein the oil-in-water emulsion of step a) is a milk product.

3. The method of claim 1, wherein the oil-in-water emulsion of step a) is a cream product.

4. The method of claim 3, wherein the cream product of step a) has a fat content not greater than 40% by weight.

5. The method of claim 1, wherein the homogenization temperature of step a) is in the range from about 50° C. to about 80° C.

6. The method of claim 1, wherein the homogenization pressure of step a) is in the range from about 10 to about 150 bar.

7. The method of claim 1, wherein the homogenization pressure of step a) is in the range from about 10 to about 100 bar, and the homogenization temperature is in the range from about 60° C. to about 75° C.

8. The method of claim 1, wherein the temperature of step b) is between about 135° C. and about 145° C.

9. The method of claim 1, wherein the temperature of step c) is between about 60° C. and about 75° C.

10. The method of claim 1, wherein the cooling temperature of step e) is between 0° C. and 6° C.

11. The method of claim 4, wherein
   (a) the cream product is subjected to a first high-pressure homogenization, wherein the temperature is between 60° C. and 75° C. and the pressure is between 10 and 100 bar,
   (b) the product of step (a) is subjected to an ultra heat treatment, wherein the temperature is between 135° C. and 145° C.,
   (c) the product of step (b) is subjected to a first cooling stage, in which the temperature is between 60° C. and 75° C.,
   (d) the product of step (c) is subjected to a second high-pressure homogenization, wherein the temperature is between 60° C. and 75° C. and the pressure is between 70 bar and 90 bar, and
   (e) the product of step (d) is subjected to a second cooling stage, wherein the temperature is a maximum of 6° C. and the cooling temperature is reached in a time interval of at most 6 seconds.

* * * * *